United States Patent
Neubauer et al.

(10) Patent No.: US 9,582,338 B2
(45) Date of Patent: *Feb. 28, 2017

(54) CALCULATING A DISPATCHER'S RELATIVE SHARE BASED ON RELATIVE QUEUE LENGTH AND CAPACITY VALUE OF A PLURALITY OF WORKLOAD TYPES AND COMPUTING SYSTEMS COMBINATIONS

(71) Applicant: International Business Machines Corporation, Armonk, NY (US)

(72) Inventors: Meik Neubauer, Boeblingen-Dagersheim (DE); Verena Steinmetz, Waltrop (DE); Robert Vaupel, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/514,966

(22) Filed: Oct. 15, 2014

(65) Prior Publication Data

US 2015/0040138 A1    Feb. 5, 2015

Related U.S. Application Data

(63) Continuation of application No. 13/550,017, filed on Jul. 16, 2012, now Pat. No. 8,875,153, which is a
(Continued)

(30) Foreign Application Priority Data

Feb. 26, 2008   (EP) .................................. 08151917

(51) Int. Cl.
G06F 9/50 (2006.01)
H04L 29/08 (2006.01)
G06F 9/48 (2006.01)

(52) U.S. Cl.
CPC .......... G06F 9/5083 (2013.01); G06F 9/4881 (2013.01); G06F 9/505 (2013.01); H04L 67/1002 (2013.01); H04L 67/1008 (2013.01)

(58) Field of Classification Search
CPC ...... G06F 9/5083; G06F 9/4881; G06F 9/505; H04L 67/1002; H04L 67/1008
See application file for complete search history.

(56) References Cited

U.S. PATENT DOCUMENTS

| 7,080,379 B2 | 7/2006 | Brenner et al. |
| 7,406,692 B2 * | 7/2008 | Halpern .................. G06F 9/505 709/201 |

(Continued)

FOREIGN PATENT DOCUMENTS

| JP | 4318655 | 11/1992 |
| JP | 6243112 | 9/1994 |

(Continued)

OTHER PUBLICATIONS

International Preliminary Report on Patentability and Written Opinion dated Sep. 10, 2010 for International Application No. PCT/EP2009/050914, 10 pages.

(Continued)

*Primary Examiner* — Benjamin Wu
*Assistant Examiner* — Jorge A Chu Joy-Davila
(74) *Attorney, Agent, or Firm* — Stephen R. Tkacs; Stephen J. Walder, Jr.; Randall J. Bluestone

(57) ABSTRACT

Mechanisms for distributing workload items to a plurality of dispatchers are provided. Each dispatcher is associated with a different computing system of a plurality of computing systems and workload items comprise workload items of a plurality of different workload types. A capacity value for each combination of workload type and computing system is obtained. For each combination of workload type and com- (Continued)

| | m | SYS1 | | | SYS2 | | | SYS3 | | | 400 |
|---|---|---|---|---|---|---|---|---|---|---|---|
| | W | cap | cap/W | | cap | cap/W | | cap | cap/W | | |
| 404 — Workload Type 1 | 300 | 90 | 0,3 | | 200 | 0,6667 | | 310 | 1,033333 | | |
| 405 — Workload Type 2 | 500 | 100 | 0,2 | | 400 | 0,8 | | 550 | 1,1 | | |
| 406 — Workload Type 3 | 10 | 10 | 1 | | 100 | 10 | | 10 | 1 | | |
| min(cap/W) | | | 0,2 | | | 0,6667 | | | 1 | | | columns: 407, 408=401, 409=402, 410=403

| | | SYS1 | | | SYS2 | | | SYS3 | | 426 |
|---|---|---|---|---|---|---|---|---|---|---|
| | | cap | q | Vm,n | cap | q | Vm,n | cap | q | Vm,n |
| Workload Type 1 | | 90 | 125 | 1,3889 | 200 | 731 | 3,655 | 310 | 0 | 0 |
| Workload Type 2 | | 100 | 89 | 0,8900 | 400 | 573 | 1,4325 | 550 | 2396 | 4,3564 |
| Workload Type 3 | | 10 | 67 | 6,7000 | 100 | 0 | 0 | 10 | 33 | 3,3 |
| 427 — 1/(1+max(Vm,n)) | | | | 0,1299 | | | 0,2148 | | | 0,1867 |

420 puting system, a queue length of a dispatcher associated with the corresponding computing system is obtained. For each combination of workload type and computing system, a dispatcher's relative share of incoming workloads is computed used on the queue length for the dispatcher associated with the computing system. In addition, incoming workload items are routed to a dispatcher, in the plurality of dispatchers, based on the calculated dispatcher's relative share for the dispatcher.

20 Claims, 4 Drawing Sheets

Related U.S. Application Data continuation of application No. 12/390,718, filed on Feb. 23, 2009, now Pat. No. 8,245,238.

(56) References Cited

U.S. PATENT DOCUMENTS

| | | | |
|---|---|---|---|
| 7,712,102 B2 | 5/2010 | Herington et al. | |
| 7,941,805 B2 | 5/2011 | Dillenberger et al. | |
| 8,245,238 B2 | 8/2012 | Neubauer et al. | |
| 2003/0158940 A1* | 8/2003 | Leigh | H04L 67/1008 |
| | | | 709/226 |
| 2004/0054999 A1* | 3/2004 | Willen | G06F 9/5044 |
| | | | 718/103 |
| 2006/0026599 A1* | 2/2006 | Herington | G06F 9/5083 |
| | | | 718/105 |
| 2006/0212873 A1 | 9/2006 | Takahisa | |
| 2007/0143460 A1 | 6/2007 | Ben-David et al. | |
| 2009/0217288 A1 | 8/2009 | Neubauer et al. | |

FOREIGN PATENT DOCUMENTS

| | | |
|---|---|---|
| JP | 2000259591 | 9/2000 |
| JP | 2000268012 | 9/2000 |
| JP | 200430663 | 1/2004 |
| JP | 2005-071031 A | 3/2005 |
| JP | 2006-048680 A | 2/2006 |
| JP | 200847126 | 2/2008 |
| WO | WO 01/13228 A2 | 2/2001 |

OTHER PUBLICATIONS

Japanese Office Action dated Nov. 15, 2011 for Counterpart Application No. 2010-547130, 5 pages.
Response to the Communication pursuant to Rules 161(1) and 162 EPC dated Oct. 18, 2010, Application No. 09716163.2-2211, PCT/EP2009050914, 1 page.
U.S. Appl. No. 13/550,017.
Wyman, L.W. et al., "zAAPs and zIIPs: Increasing the strategic value of System z", IBM J. Res & Dev., vol. 51, No. 1/2, Jan./Mar. 2007, pp. 77-86.

* cited by examiner

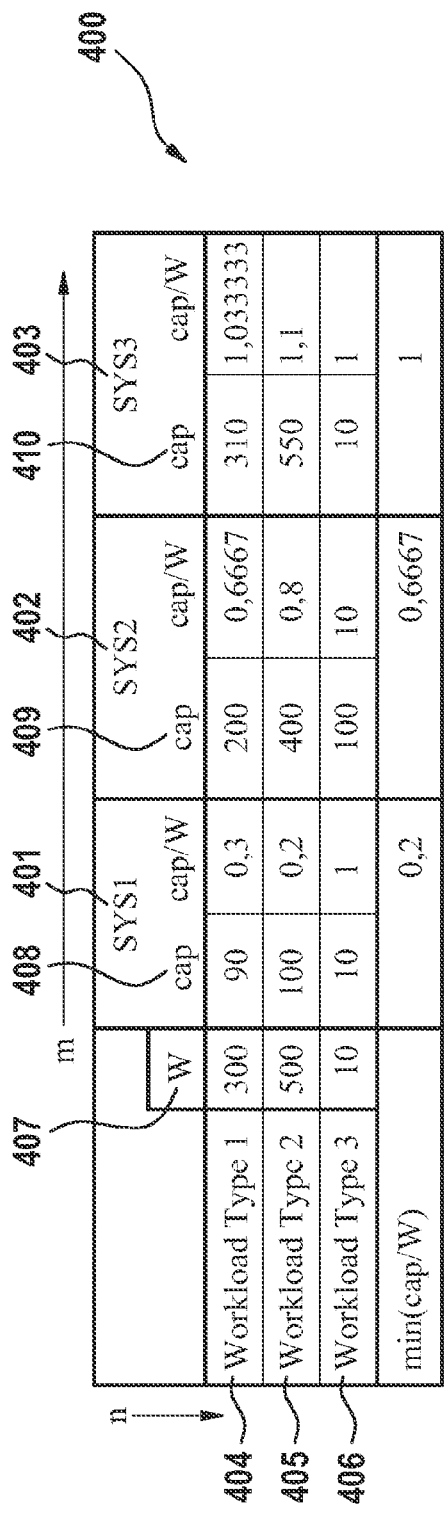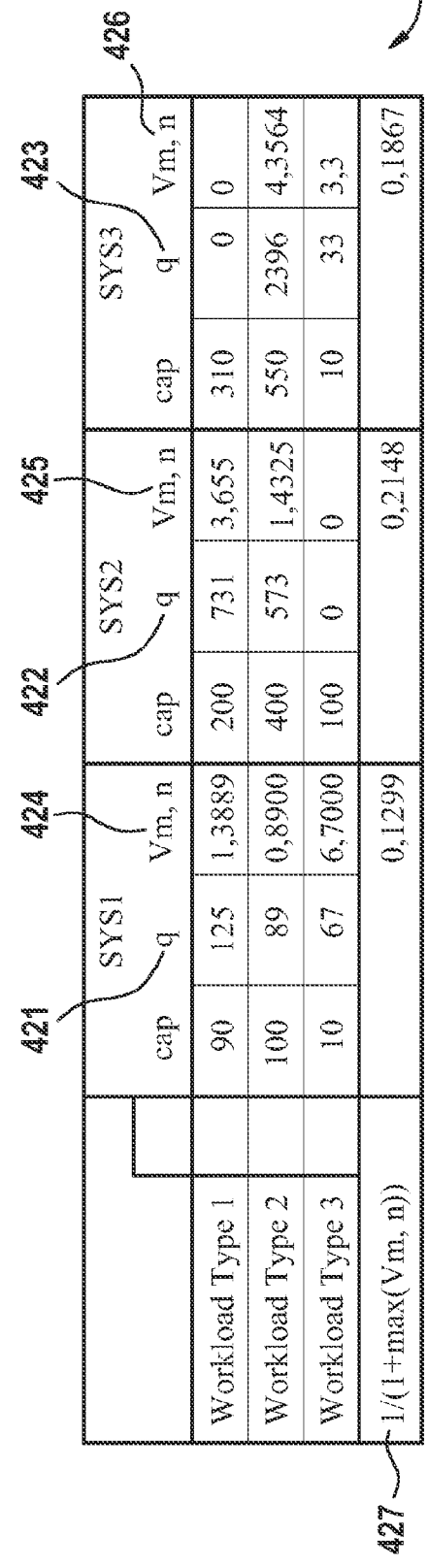
Fig. 4

CALCULATING A DISPATCHER'S RELATIVE SHARE BASED ON RELATIVE QUEUE LENGTH AND CAPACITY VALUE OF A PLURALITY OF WORKLOAD TYPES AND COMPUTING SYSTEMS COMBINATIONS

The invention relates generally to an improved data processing apparatus and method and more specifically to mechanisms for calculating a routing workload in a workload manager.

Mainframes are computers used mainly by large organizations for executing critical applications and processing great amounts of data, e.g., financial transaction processing. Mainframes are highly redundant for providing reliable and secure systems. Mainframes are able to run or host multiple operating systems and therefore, may replace the use of dozens of smaller servers, thereby reducing management and providing improved scalability. Modern mainframes include the international Business Machines (IBM) zSeries™ and System z9™ servers, available from IBM Corporation of Armonk, N.Y.

A parallel sysplex is a cluster of IBM mainframes acting together as a single system image, using z/OS. A sysplex uses parallel processing and enables read/write data sharing across multiple systems, with full data integrity, in order to cluster up to 32 systems and share a workload across the systems. The workload can be dynamically distributed across individual processors within a single system, as well as distributed to any system in a cluster having available resources. Workload balancing also permits running diverse applications across a parallel sysplex cluster, while maintaining a critical response level. If the workload balancing or workload routing is not done correctly, however, an overload in the system may occur.

SUMMARY

The present invention provides mechanisms for calculating a dispatcher's share (D) in a workload manager, the workload manager being coupled to an arbitrator, the arbitrator being coupled to a plurality of systems, and each system comprising a dispatcher. Each dispatcher is coupled to a plurality of execution units. The arbitrator is adapted to receive and distribute a flow of workload items to the dispatchers. The execution units are adapted to execute the workload items, the workload items being of at least a first, a second and a third type. The mechanisms operate to: read a total value of service units (W) for each workload type across the plurality of systems from a memory, the service units being a value for measuring processor consumption in a time interval; and read a capacity (cap) value for each workload type on each system (SYS) of the plurality of systems from the memory, the capacity value being indicative of a maximum value of service units that a system can execute in the time interval.

The mechanisms further operate to: calculate a first, second and third dispatcher's relative share (R) by dividing the capacity of each workload type on each system by the total value of service units of each workload type and obtaining a minimum value of the dispatcher's relative share of each system; calculate a relative queue length (V) for each system by dividing a queue length (q) of the workload items for each workload type on each system by the capacity of each workload type on each system; and calculate the dispatcher's share (D) for each system by combining the minimums value and a first function of the relative queue length using an arithmetic operation.

In one illustrative embodiment, the dispatcher's share refers to the dispatcher's share to all routing, that is the share of workload that all dispatchers receive from the arbitrator. Moreover, in one illustrative embodiment, the dispatcher's relative share refers to the dispatcher's relative share of smallest relative execution capacities.

The first function of the relative queue length may comprise function for calculating an inverse of a maximum of the relative queue length. The arithmetic operation may be a multiplication operation. The first, second and third workload type may be a general CPU (CP), z Application Assist Processor (zAAP), and z9 Integrated information Processor (zIIP) type workload. The dispatcher's share may be normalized by dividing the dispatcher's share by an addition of all dispatcher's shares of all systems.

The minimum value may be normalized by dividing the minimum value by an addition of all minimum values of all systems. The arbitrator may distribute the flow of workload items to other dispatchers in other systems.

One of the advantages of the illustrative embodiments is that the queues in the dispatchers and the execution units do not crow to infinity as a result of capacity shortage or an outage of an execution unit, as long as the total sysplex capacity still exceeds the total workload demand for every workload type. For these cases, the dispatcher's share of all routings to each system depends on the queue length relative to its capacity co any processor and the relative value of the total value of services unity of a workload type by its capacity. In the case of an outage of an execution unit on one system, it is possible to compensate for the execution unit by distributing the workload to other systems without resulting in an overflow of, or congestion of, resources in the other systems. Other advantages are that the dispatcher's share calculation is independent of the initial workload distribution and the algorithm converges to an optimal workload distribution.

In another aspect, the illustrative embodiments provide a computer program product stored on a computer usable medium, comprising computer readable program means for causing a computer to perform a method according to the invention when the program is run on the computer.

In another aspect, the illustrative embodiments provide a data processing system for workload management operable to perform according to any of the preceding embodiments.

BRIEF DESCRIPTION OF SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram illustrating a calculation operation of the workload manager in accordance with one illustrative embodiment.

DETAILED DESCRIPTION

Figure 1:
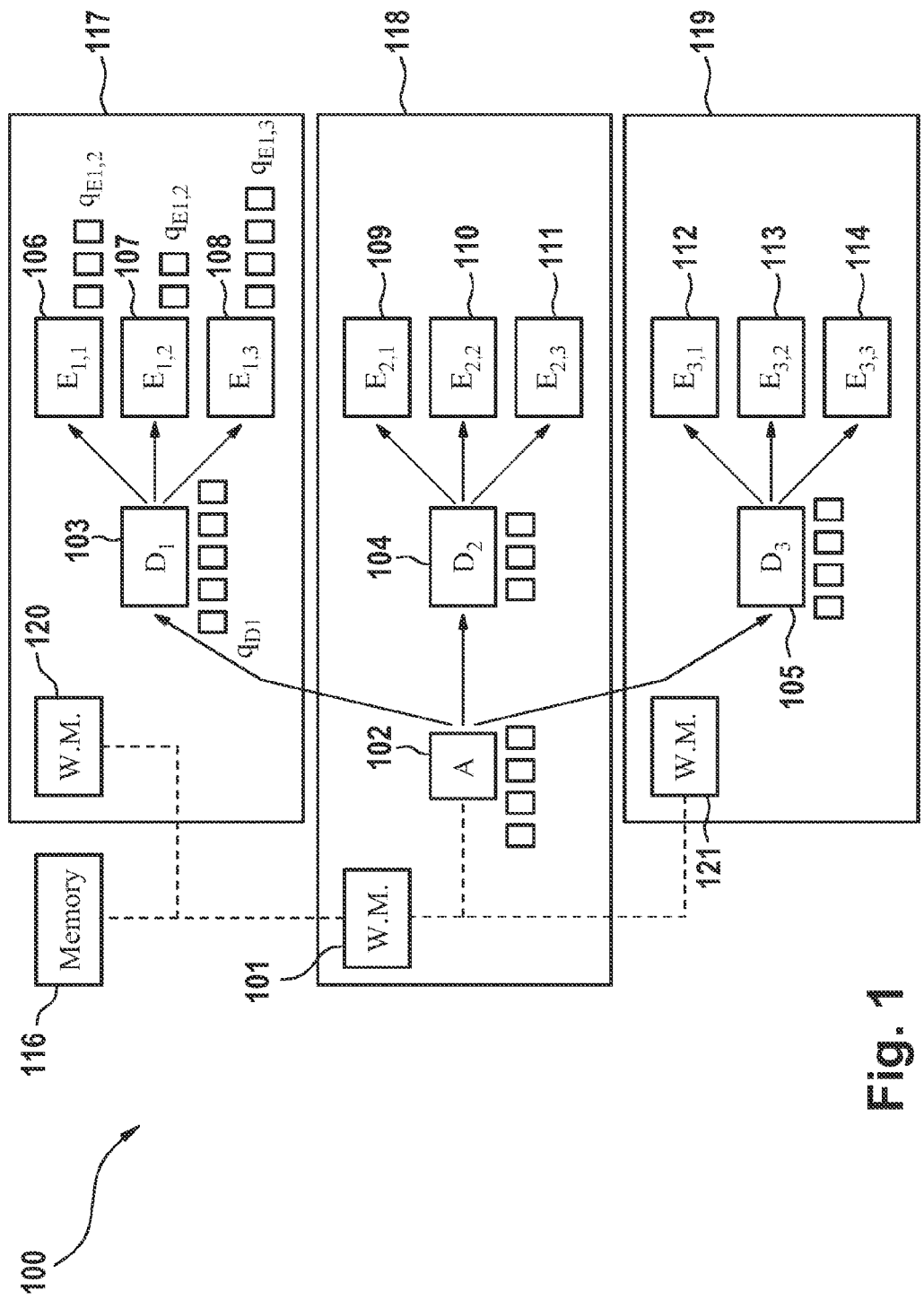
FIG. 1 is an example block diagram of a first sysplex according to one illustrative embodiment.

FIG. 1 is an example block diagram 100 of a first sysplex comprising a first system 118 with a first workload manager 101 coupled to an arbitration device, referred to as an arbitrator, 102. The arbitrator is coupled to a first, a second, and a third dispatcher 103-105, each dispatcher being coupled to three execution units 106-114. In the depicted example, the first workload manager 101 may be coupled to another two workload managers 120-121. The first dispatcher $D_1$ 103 is located in a second system 117 and is coupled to the execution units $E_{1,1}$ to $E_{1,3}$ 106-108. The dispatcher $D_2$ 104 is located in the first system 118 and is coupled to the three execution units $E_{2,1}$ to $E_{2,3}$ 109-111. The third dispatcher $D_3$ 105 is located in the third system 119 and is coupled to another three execution units $E_{3,1}$ to $E_{3,3}$ 112-114. A memory 116 is coupled to the workload manager 101.

In the depicted example, an arbitrator 102 receives incoming workload items and routes them to dispatching units 103-105. Each dispatcher $D_1$ to $D_3$ 103-105 determines the workload type of the workload items and routes them to appropriate specialized execution units $E_{1,1}$ to $E_{3,3}$ 106-114. The queue length of the plurality of workload items can be measured for each dispatcher $D_1$ to $D_3$ 103-105 and each execution unit. $E_{1,1}$ to $E_{3,3}$ 106-114. For example, the dispatcher $D_1$ 103 has a queue length ($q_{D1}$) of five workload items and the execution unit $E_{1,1}$ 106 has a queue length ($q_{E1,1}$ of three workload items. While the queue lengths for all dispatchers $D_1$ to $D_3$ 103-105 and/or execution units $E_{1,1}$ to $E_{3,3}$ 106-114 may be measured, there is no requirement that all dispatchers and/or execution units have their queue lengths measured by the mechanisms of the illustrative embodiments. The queue lengths are used, for each system in a plurality of systems, to generate a relative queue length for each workload type on the systems which in turn is used, along with a defined function, to calculate each dispatcher's relative share of the incoming workload. The details of such calculations are provided hereafter.

Each workload item requires a different CPU consumption, e.g., number of processor cycles, of an execution unit within a given time interval, and that consumption is not known in advance by the arbitrator 102. Thus, the assignment of the plurality of workload items to the dispatchers $D_1$ to $D_3$ 103-105 does not depend on the size of each workload item or its CPU consumption. The workload type of each workload item is identified by the dispatchers $D_1$ to $D_3$ 103-105, and the size of the workload items is identified either by the dispatcher $D_1$ to $D_3$ 103-105 or by the execution units $E_{1,1}$ to $E_{3,3}$ 106-114. As the arbitrator 102 does not know in advance the workload type of the workload items and the size of the workload items, a wrong workload balancing logic or algorithm may cause a queue of a dispatcher and/or execution unit to grow to infinity. With the illustrative embodiments, the workload managers 101,120, and 121 of the systems 117-119 are coupled to one another and may constantly interact and communicate the capacity and workload values of the systems 117-119.

The memory 116 may store the values of a total value of services units of all workload types across the plurality of systems 117-119, and a capacity value of all workload types of each system 117-119. The service units are a value that measures the processor (CPU) consumption within a given time interval. The capacity value is a value indicative of a measure of the maximum amount of service units that a system is capable of executing in a given time interval.

Figure 2:
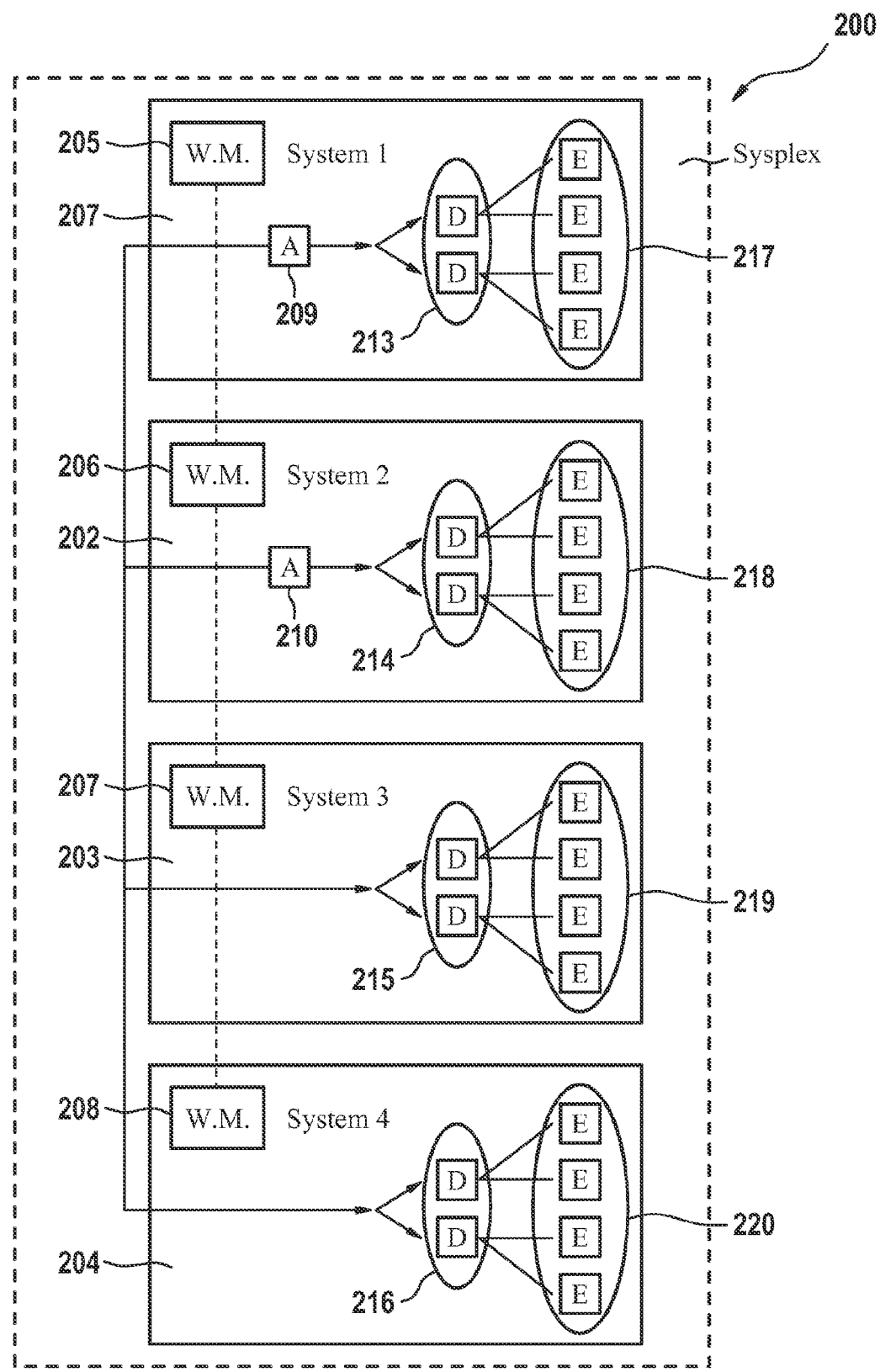
FIG. 2 is an example block diagram of a plurality of interconnected systems forming a sysplex according to one illustrative embodiment.

FIG. 2 shows an example of a Sysplex 200 that is formed by a plurality of interconnected systems including a first, second, third and fourth system 201-204. Each system 201-204 includes a workload manager 205-208, with all workload managers 205-208 being coupled to each other. The workload managers 205-206 are coupled to the arbitrators 209-210. Alternatively, it is sufficient to have one arbitrator in the whole sysplex 200. The arbitrators 209-210 are coupled to a plurality of dispatchers 213-216 and each dispatcher 213-216 is coupled as well to a plurality of execution units 217-220. Not every system requires an arbitrator, as the arbitrator may route the workload to any system 201-204 in the sysplex 200.

Each workload manager 205-208 processes a routing algorithm, in accordance with the mechanisms of the illustrative embodiments, or otherwise implements the routing algorithm in hardware logic. The routing algorithm calculates a dispatcher's share of a relative amount of workload items a dispatcher should receive. The arbitrators 209-210 do not know the workload type or workload size of the workload items and receive the routing recommendations from the workload manager 205-208. The arbitrators 209-210 distribute the workload items according to the results of the routing algorithm as communicated to the arbitrators 209-210 from the workload managers 205-208.

The dispatchers 213-216, also known as queue managers, receive the workload items from the arbitrators 209-210 and queue them until they are fetched by the execution units 217-220, also called servers. The execution units 217-220 execute the workload items, read the workload type, and decide what processor is able to process the workload item. The workload types may be of a plurality of different types. In one illustrative embodiment, the workload types may be of three or more types including general CPU (CP), z Application Assist Processor (zAAP), and z9 Integrated Information Processor (zIIP) workload types. A different processor is used for each workload type. The workload managers 205-208 across all the systems 201-204 are coupled in order to receive the information related to the dispatcher status across all the systems 201-204.

Figure 3:
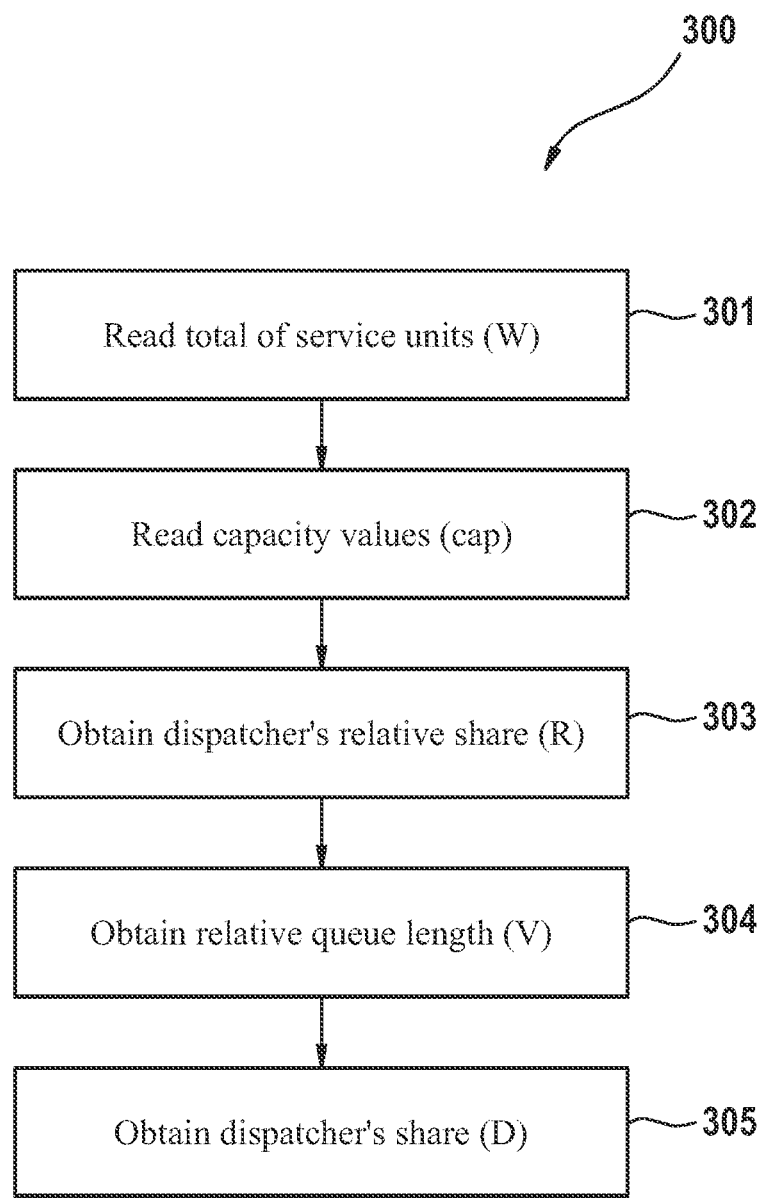
FIG. 3 is an example flow chart of an operation for calculating a dispatcher's share according to one illustrative embodiment.

FIG. 3 is an example flow diagram 300 of an operation for calculating a dispatcher's share (D) in a workload manager. As shown in FIG. 3, a first step 301 comprises obtaining a total value of service units for each workload type across a plurality of systems for a given time interval in progress. As noted above, the service units are a value that measures the CPU consumption in a time interval. In one illustrative embodiment, the total value of service units includes a service unit value for a first workload type, a service unit value for a second workload type, and a service unit value for a third third workload types. Further workload types may also be available in the system, with a further corresponding total value of service units. The service unit values may be a number of service units with the total value of service units being a total number of service units, for example.

The second step 302 includes obtaining a capacity value for each workload type, including the first, second and third workload type on each system of the plurality of systems. As mentioned above, the capacity value is indicative of a measure of a maximum amount, or number, of service units that a system is capable of executing in a time interval. A different capacity value is obtained for each workload type and for each system, so that each system will include a capacity value for each workload type.

The flow diagram 300 further comprises a third step 303 for calculating a dispatcher's relative share of the workload items. This relative share, in one illustrative embodiment, is obtained in the following manner. For each system and for each workload type, the total capacity for the workload type is divided by a corresponding total value of service units for the workload type in the given time period as a whole, for the particular system. The obtained capacity to total value of service units ratio for each workload type is then used to determine a minimum value of the ratio for each system.

On the third step 303, a single value is obtained for each system. The forth step 304 comprises calculating a relative queue length from each system by dividing a queue length of the workload items for each workload type on each system by the capacity of each workload type on each system, each system obtaining a value for each workload type. The fifth step 305 calculates the dispatcher's share (D) for each system by combining the minimum value and a first function of the relative queue length using an arithmetic operation, as described in greater detail hereafter with regard to FIG. 4.

FIG. 4 shows an example of a calculation of the dispatcher's share for distributing a flow of workload items across a plurality of dispatchers in accordance with one illustrative embodiment. The table comprising three systems 401-403, a first workload type 404, a second or type 405, and a third workload type 406; a total value of service units 407, a plurality of capacities on each system, the first plurality of capacities 408 on the first system 401, the second plurality of capacities 409 on the second system 402, and the third plurality of capacities 410 on the third system 403. The second table 420 further comprises a plurality of queue lengths 421-423 of each workload type and on each system SYS1, SYS2, and SYS2 401-403, a calculated relative queue length 424-426 on each system and for each workload type, and a function 427 of the relative queue length for each workload type on each system.

One of the first steps for calculating a dispatcher's share in a workload manager includes obtaining the values for the total value of service units 407 of each workload type across all the systems 401-403. In this example, the total value of service units on the first system 401 for the first workload type is 300, the total value of service units for the second workload type is 500 and the third total value of service units for the third workload type is 10.

Another step includes obtaining a capacity value of each system 401-403 and workload type. For example, on the first system 401 the capacity of the first workload type is 90, the capacity of the second workload type is 100, and the capacity for the third workload type is 10. On the second system 402, the capacity for the first workload type is 200, the capacity for the second workload type is 400, and the capacity for the third workload type is 100. After the capacities are obtained for all the systems, a dispatcher's relative share may be calculated on each system 401-403 and for each workload type.

On the first system 401, a first workload that a system is able to process is obtained by dividing the capacity of the first workload type, corresponding to '90', by the total value of service units of the first workload type, corresponding to '300', resulting in '0.3'. The second capacity of the second workload type, with a value of '100', is divided by the total value of service units of the second workload type, with a value of '500', resulting in a second workload for the system 401 is able to process of '0.2'. These values refer to the actual workload in percentage that the system 401 is able to process. The same process is repeated for the third workload type that results in '1' and the same is repeated across all the systems 402-403 obtaining three different values for each system.

Another step of the method of calculating a dispatcher's share includes calculating a minimum value of the previously obtained dispatcher's relative share. For example on the first system 401 there are three values of the dispatcher's relative share, which are '0.3', '0.2' and '1'. The minimum value of these three values is '0.2'. For the second system, the minimum value is '0.6', and on the third system the minimum value of the dispatcher's relative share is '1'.

The second table 420 shows an example of the following steps that comprises the method of calculating a dispatcher's share that includes calculating the relative queue length 424-426 by dividing a queue length 421-423 by the capacity 408-410 for a specific workload type. On the first system 401, and for the first workload type, the queue length 421 is '125'. The queue length 421 for the second workload type is '89' and the third queue length 421 for the third workload type is '67'. The first relative queue length 424 of the first system 401 is obtained by dividing '125' by '90', obtaining '1.388'. The second relative queue length 424 is obtained by dividing '89' by '100', obtaining '0.89'. The same process is repeated for all queue lengths of all workload types across all the systems 401-403, so that the third relative queue length 424 of the first system 401 is '6.7'.

The table 420 further comprises a first function 427 of the relative queue lengths 424-426 that includes obtaining the inverse value of one plus the maximum relative queue length. On the first system 401 the maximum relative queue length is '6.7', so that the inverse of that value plus 1 is '0.12987' (which is rounded to 0.1299 in FIG. 4). On the second system 402, the highest relative queue length is '3.655', so that the inverse of one plus the value is '0.2148'. For the third system 403, the maximum relative queue length is '4.356' and the inverse value of the maximum queue length is '0.1867'. When all these values are calculated, for each system, the dispatcher's share is obtained by multiplying the minimum value of a dispatcher's relative share of the system by the first function value 427 of the system. Thus, for the first system 401, the minimum value of '0.2' is multiplied by the first function value '0.1299' thereby obtaining '0.02598'. For the second system 402, the minimum value of '0.6667' is multiplied by the first function value '0.2148' to obtain a value of '0.1432'.

Finally, for the third system 403, the minimum value of '1' is multiplied by the first function value of '0.1867' to obtain a value of '0.1867'. These three dispatcher's share values indicate the dispatcher's share for each system 401-403, so that the arbitrator can route a different amount of workload units for each dispatcher. As a result, the best possible distribution of the workload items is obtained across all the dispatchers and for all the systems 401-403. After a predefined, fixed time interval, the calculation is repeated, taking into account any changes in the workload W, the capacities, and queue lengths. Thus, the mechanisms of the illustrative embodiments adjusts the dispatchers' shares to new optimal values.

The illustrative embodiments of the present invention can take the form of an entirely hardware embodiment, an entirely software embodiment, or an embodiment containing both hardware and software elements. In a preferred embodiment, the illustrative embodiments of the present invention are implemented in software, which includes but is not limited to firmware, resident software, microcode, etc.

Furthermore, the illustrative embodiments of the present invention can take the form of a computer program product accessible from a computer-usable or computer-readable medium providing program code for use by, or in connection with, a computer or any instruction execution system. For the purposes of this description, a computer-usable or computer readable mediums can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only disk memory (CD-ROM), compact disk—read/write (CD-R/W) and DVD.

A data processing system suitable for storing and/or executing program code will include at least one processor coupled directly, or indirectly, to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the foregoing has been with reference to particular illustrative embodiments of the present invention, it will be appreciated by those skilled in the art that changes in these illustrative embodiments may be made without departing from the principles and spirit of the present invention, the scope of which is defined by the appended claims.

The invention claimed is:

1. A method, in a workload manager, for distributing workload items to a plurality of dispatchers, each dispatcher being associated with a different computing system of a plurality of computing systems, the workload items comprising workload items of a plurality of different workload types, the method performed by the workload manager comprising:
   obtaining a capacity value for a combination of a given workload type and a given computing system in the plurality of computing systems, the capacity value representing a total capacity of workload items of the given workload type that the given computing system may process in a given time period;
   obtaining for the combination of the given workload type and the given computing system, a queue length of a given dispatcher associated with the given computing system;
   calculating, for the combination of the given workload type and the given computing system, a relative share of incoming workloads based on the queue length for the given dispatcher and the capacity value associated with the given workload type and the given computing system; and
   routing incoming workload items to the given dispatcher based on the calculated relative share for the given dispatcher.

2. The method of claim 1, further comprising:
   obtaining, in the workload manager, for the combination of the given workload type and the given computing system, a total value of service units for the given workload type on the given computing system, wherein, for the combination of the given workload type and the given computing system, the relative share of incoming workloads is calculated based on the total value of service units for the given workload type on the given computing system.

3. The method of claim 2, wherein the total value of service units for the combination of the given workload type and the given computing system, and the capacity value for the combination of the given workload type and the given computing system, are obtained from a memory associated with the workload manager.

4. The method of claim 1, wherein calculating the relative share comprises:
   dividing the queue length of the given dispatcher by the capacity value for the combination of the given workload type and the given computing system.

5. The method of claim 1, wherein the plurality of workload types comprises a general processor workload type (CP), an application assist processor workload type (zAAP), and an integrated information processor workload type (zIIP).

6. The method of claim 1, wherein the plurality of computing systems are part of a sysplex.

7. The method of claim 1, wherein routing the incoming workload items to the given dispatcher comprises sending a routing recommendation to an arbitrator.

8. The method of claim 7, wherein the arbitrator distributes the incoming workload items to the given dispatcher according to the routing recommendation.

9. The method of claim 8, wherein the given dispatcher receives the incoming workload items and queues the incoming workload items to be fetched by one or more execution units.

10. The method of claim 1, wherein routing the incoming workload items to the given dispatcher comprises sending routing recommendations to an arbitrator, wherein the arbitrator distributes the incoming workload items to the plurality of dispatchers according to the routing recommendations.

11. A method, in a workload manager, for distributing workload items to a plurality of dispatchers, each dispatcher being associated with a different computing system of a plurality of computing systems, the workload items comprising workload items of a plurality of different workload types, the method performed by the workload manager comprising:
   calculating a capacity percentage for each combination of a given workload type and a given computing system in the plurality of computing systems, the capacity percentage representing a percentage of workload items of the given workload type that the given computing system can process in a given time period;
   determining a minimum capacity percentage from the calculated capacity percentage from each combination of workload types and computing systems;
   calculating, for each combination of a given workload type and a given computing system, a relative queue length of a dispatcher associated with the given computing system;

determining a maximum relative queue length of a dispatcher from the calculated relative queue length from each combination of workload types and computing systems;

determining, for each given computing system, a dispatcher's relative share of incoming workloads based on the minimum capacity percentage and the maximum relative queue length of the given computing system; and routing incoming workload items to the plurality of dispatchers based on the calculated relative share for each dispatcher.

12. The method of claim 11, wherein calculating the capacity percentage for each combination of a given workload type and a given computing system comprises:

obtaining, in the workload manager, a total value of service units of the given workload type across the plurality of computing systems;

obtaining, in the workload manager, a capacity value for the given workload type and the given computing system, the capacity value representing a total capacity of workload items of the given workload type that the given computing system can process in a given time period; and dividing the capacity value of the given computing system for the given workload type by the total value of service units of the given workload type to form the capacity percentage.

13. The method of claim 11, wherein calculating the relative queue length for each combination of a given workload type and a given computing system comprises:

obtaining, in the workload manager, a total value of service units of the given workload type across the plurality of computing systems;

obtaining, in the workload manager, a queue length for the given workload type and the given computing system; and dividing the queue length for the given workload type and the given computing system by the total value of service units of the given workload type across the plurality of computing systems.

14. The method of claim 11, wherein determining a dispatcher's relative share for each given computing system comprises:

determining an inverse of one minus the maximum relative queue length of the given computing system to form an intermediate result; and multiplying the minimum capacity percentage of the given computing system by the intermediate result to form the relative share.

15. The method of claim 11, wherein the plurality of workload types comprises a general processor workload type (CP), an application assist processor workload type (zAAP), and an integrated information processor workload type (zIIP).

16. The method of claim 11, wherein the plurality of computing systems are part of a sysplex.

17. The method of claim 11, wherein routing the incoming workload items to the plurality of dispatchers comprises sending routing recommendations to one or more arbitrators.

18. The method of claim 17, wherein the one or more arbitrators distribute the incoming workload items to the plurality of dispatchers according to the routing recommendations.

19. The method of claim 18, wherein the plurality of dispatchers receive the incoming workload items and queue the incoming workload items to be fetched by a plurality of execution units.

20. The method of claim 11, wherein routing the incoming workload items to the plurality of dispatchers comprises sending routing recommendations to an arbitrator, wherein the arbitrator distributes the incoming workload items to the plurality of dispatchers according to the routing recommendations.

* * * * *